Dec. 14, 1948.                R. D. COLLINS                2,456,383
                 ADJUSTABLE HOLDER FOR PRECISION INDICATORS
                          Filed Nov. 24, 1944
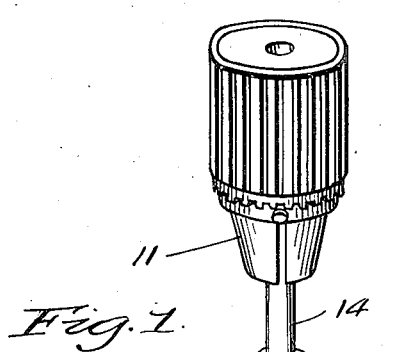
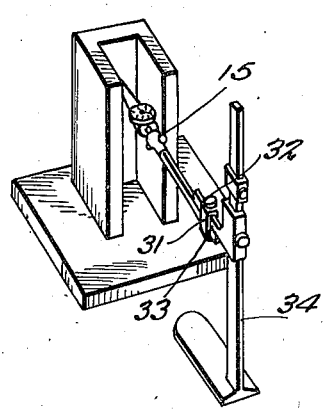
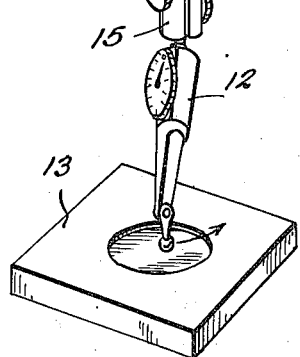
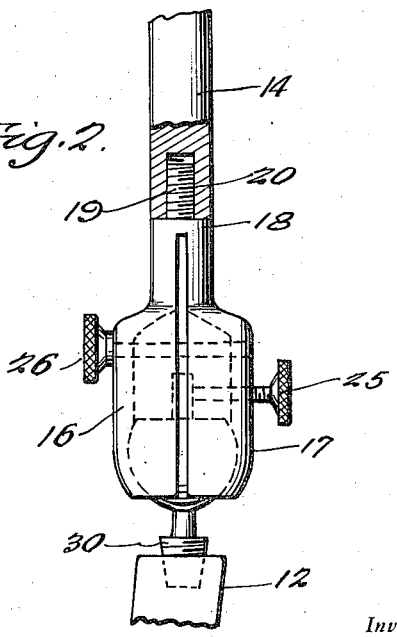
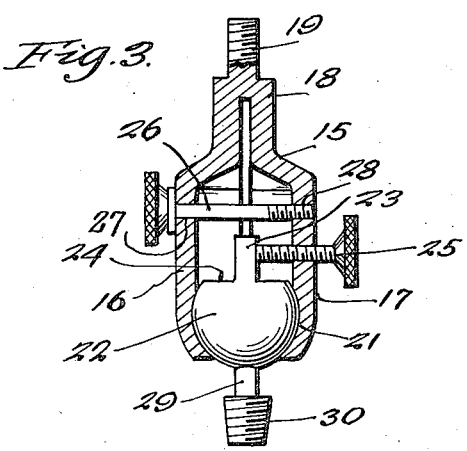
Inventor
Richard D. Collins,
By Clarence A. O'Brien
and Harvey B. Jacobson
Attorneys Patented Dec. 14, 1948

2,456,383

UNITED STATES PATENT OFFICE 2,456,383

ADJUSTABLE HOLDER FOR PRECISION INDICATORS

Richard D. Collins, Baltimore, Md.

Application November 24, 1944, Serial No. 565,028

1 Claim. (Cl. 287—12)

This invention relates to improvements in a holder for precision indicators and has for its object to provide a simple, quick means whereby the delicate, final adjustment required for indicating location for holes while jig boring, milling, etc., may be made.

Another object of the invention is to provide an adjustable holder for precision indicators for indicating around circular bosses or similar work of such a compact design as will give clearance for indicating in narrow slots or other cramped quarters.

Other features and advantages will become more readily apparent from the following description and the accompanying illustrative drawings in which:

Figure 1 is a perspective view of my device shown clamped in a drill chuck and in operative position, Figure 2 is an elevational view of my holder, Figure 3 is a vertical sectional view thereof, Figure 4 is a detail elevation of a sphere, and Figure 5 is a perspective view of the device shown in operative position in connection with a piece of work where the quarters are quite cramped.

In the drawings and the following specification like reference characters indicate like parts throughout and in which 10 is my indicator holder shown attached to a drill chuck 11, and to which is attached at its lower end a precision indicator 12, operating upon a piece of work 13. My invention comprises a shank 14, screw threaded to a hollow clamp 15, having jaws 16 and 17, integrally connected at 18 and terminating at its upper end in a male screw 19, for engaging the threaded bore 20, in the lower end of shank 14. In the lower end of the clamp 15, is formed a ball socket 21, in which seats substantially a semi-spherical ball 22, which is provided with a tongue 23 projecting up from its flattened surface 24, which tongue is adapted to be engaged by an adjusting screw 25, threaded through the jaw 17. A tension screw 26 is slidable through a smooth bore 27, in jaw 16 and is threaded through the bore 28 in the jaw 17 whereby tension upon the ball 22 may be had. Projecting down from the ball 22 is a shank 29, which terminates in a screw 30, for screwing into the indicator 12.

In Figure 5, I show my member 15, screwed to a supporting shank, engaged by a yoke 31, having a set screw 32, on an adjustable slide arm 33, of a vernier gage 34, whereby the indicator may be used in very close quarters as per one illustration (Fig. 5).

It will be observed from the above description that I have provided an adjustable holder for precision indicators of very simple construction and one which will provide quick means of making delicate final adjustments such as required when indicating holes while jig boring, milling, etc., or indicating around circular bosses or similar work. The device is made so compact that it will give clearance for indicating in narrow slots or cramped quarters and such as cannot be found in the present methods of holding indicators.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

That which I claim as new is:

Means for holding a dial gage against a work piece which includes a supporting shank adapted to be fixed to a support, said shank having an axial internally screw threaded socket entering its end remote from the support, a clamp having an axial externally screw threaded stem at one end for entrance into the socket in the end of the supporting shank, said clamp having an axial socket entering its end remote from the threaded stem and a pair of opposed spherical clamping surfaces in the socket adjacent the end remote from the stem, a clamp screw extending transversely through the clamp for advancing said clamping surfaces toward one another, a spheroidal head within the socket in the clamp between the spherical clamping surfaces, said head having a flat, a neck projecting from the spheroidal head opposite the flat and through the end of the socket remote from the stem, an externally screw threaded head on the neck for entrance into the threaded socket in a dial gage detachably to couple the gage to the spheroidal head, a tongue on the spheroidal head diametrically opposite the neck, said tongue extending transversely of the flat and an adjusting screw threaded through the wall of the clamp for engagement with the tongue on the spheroidal head for rotating the head in one direction about an axis which lies perpendicular to the longitudinal axis of the clamp.

RICHARD D. COLLINS.

REFERENCES CITED

The following references are of record in the file of this patent:

UNITED STATES PATENTS

| Number | Name | Date |
| --- | --- | --- |
| 282,117 | Randolph | July 31, 1883 |
| 546,421 | Duke | Sept. 17, 1895 |
| 855,149 | Vaughn et al. | May 28, 1907 |
| 1,186,428 | Newman | June 6, 1916 |
| 1,239,653 | Willard | Sept. 11, 1917 |
| 1,261,894 | Barnes | Apr. 9, 1918 |
| 1,528,967 | Bersted | Mar. 10, 1925 |
| 1,661,993 | Borda | Mar. 6, 1928 |
| 2,089,439 | Silberstein | Aug. 10, 1937 |